(12) United States Patent
Hu et al.

(10) Patent No.: US 11,388,345 B2
(45) Date of Patent: Jul. 12, 2022

(54) IMAGE DATA PROCESSING DEVICE, CAPTURING EQUIPMENT AND DISPLAY SYSTEM

(71) Applicant: APPOTRONICS CORPORATION LIMITED, Shenzhen (CN)

(72) Inventors: Fei Hu, Guangdong (CN); Yi Li, Guangdong (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 113 days.

(21) Appl. No.: 16/626,061

(22) PCT Filed: Sep. 26, 2017

(86) PCT No.: PCT/CN2017/103423
§ 371 (c)(1),
(2) Date: Apr. 9, 2021

(87) PCT Pub. No.: WO2019/000672
PCT Pub. Date: Jan. 3, 2019

(65) Prior Publication Data
US 2021/0235003 A1    Jul. 29, 2021

(30) Foreign Application Priority Data

Jun. 26, 2017    (CN) .......................... 201710495677.0

(51) Int. Cl.
*H04N 5/235* (2006.01)
*G09G 3/20* (2006.01)
(Continued)

(52) U.S. Cl.
CPC ......... *H04N 5/2351* (2013.01); *G09G 3/2003* (2013.01); *G09G 3/2007* (2013.01);
(Continued)

(58) Field of Classification Search
CPC ......... G09G 2360/16; G09G 2320/066; G09G 2320/0276; G09G 2320/0626;
(Continued)

(56) References Cited

U.S. PATENT DOCUMENTS

| 6,970,148 B2 * | 11/2005 | Itoh ...................... G09G 3/3648 345/63 |
| 7,095,451 B2 * | 8/2006 | Kitazawa ................. H04N 5/20 348/E9.037 |

(Continued)

FOREIGN PATENT DOCUMENTS

| CN | 1685710 A | 10/2005 |
| CN | 101707666 A | 5/2010 |

(Continued)

OTHER PUBLICATIONS

First Office Action for Application No. 201710495677.0, The State Intellectual Property Office of People's Republic of China, dated Jul. 3, 2020.

(Continued)

*Primary Examiner* — Dismery Mercedes
(74) *Attorney, Agent, or Firm* — Marshall, Gerstein & Borun LLP

(57) ABSTRACT

An image data processing device includes a data acquisition module for acquiring image data including original data information of images, the original data information of each image including the luminance value of each pixel in the image, and the luminance range that the image data may represent being Lmin-Lmax; a data conversion module for receiving the image data and converting the original data information of each image into new data information; and a data output module for outputting the new data information of each image in the data conversion module together with the corresponding maximum relative luminance value η

(Continued)

thereof. A capturing equipment and a display system are also provided.

11 Claims, 2 Drawing Sheets

(51) Int. Cl.
  *G09G 3/34* (2006.01)
  *G09G 3/36* (2006.01)
  *G09G 3/3233* (2016.01)

(52) U.S. Cl.
  CPC ......... *G09G 3/3233* (2013.01); *G09G 3/3406* (2013.01); *G09G 3/3607* (2013.01); *G09G 3/3648* (2013.01); *H04N 5/2353* (2013.01); *G09G 2300/0465* (2013.01); *G09G 2320/029* (2013.01); *G09G 2320/0233* (2013.01); *G09G 2320/0271* (2013.01); *G09G 2320/0626* (2013.01); *G09G 2320/0646* (2013.01); *G09G 2320/0666* (2013.01); *G09G 2360/16* (2013.01)

(58) Field of Classification Search
  CPC ... G09G 2320/0646; G09G 2320/0271; G09G 2320/064; G09G 2320/0673; G09G 2320/06; G09G 2320/0295; G09G 2320/0233; G09G 3/3648; G09G 3/2003; G09G 3/3607; G09G 2340/06
  See application file for complete search history.

(56) References Cited

U.S. PATENT DOCUMENTS

| | | | |
|---|---|---|---|
| 8,063,897 B2* | 11/2011 | Mamba | G09G 3/3648 345/213 |
| 9,349,333 B2* | 5/2016 | Ooga | G09G 3/3406 |
| 9,520,075 B2* | 12/2016 | Cho | G09G 3/2003 |
| 9,711,112 B2* | 7/2017 | Ooga | G09G 3/3611 |
| 10,546,554 B2* | 1/2020 | Xiong | G09G 5/10 |
| 10,580,367 B2* | 3/2020 | Vernon | H04N 19/98 |
| 10,832,388 B2* | 11/2020 | Liu | G06T 5/40 |
| 11,074,882 B2* | 7/2021 | Wang | H04N 1/4015 |
| 11,102,460 B2* | 8/2021 | Li | H04N 9/3182 |
| 11,102,463 B2* | 8/2021 | Bist | H04N 9/68 |
| 2004/0257324 A1 | 12/2004 | Hsu | |
| 2006/0221046 A1 | 10/2006 | Sato et al. | |
| 2015/0009249 A1* | 1/2015 | Kudo | G09G 3/3426 345/691 |
| 2018/0300862 A1* | 10/2018 | Keating | G06T 5/009 |

FOREIGN PATENT DOCUMENTS

| | | |
|---|---|---|
| CN | 102257531 A | 11/2011 |
| CN | 102625030 A | 8/2012 |
| CN | 103581566 A | 2/2014 |
| CN | 106023101 A | 10/2016 |

OTHER PUBLICATIONS

Second Office Action for Application No. 201710495677.0, The State Intellectual Property Office of People's Republic of China, dated Apr. 6, 2021.

International Search Report for International Application No. PCT/CN2017/103423, dated Mar. 28, 2018.

* cited by examiner

IMAGE DATA PROCESSING DEVICE, CAPTURING EQUIPMENT AND DISPLAY SYSTEM

CROSS-REFERENCE TO RELATED APPLICATION

This is the United States national phase of International Patent Application No. PCT/CN2017/103423, filed Sep. 26, 2017, which application claims to Chinese Patent Application No. CN201710495677.0, filed Jun. 26, 2017. The entirety of each of the foregoing priority applications are hereby incorporated by reference herein.

FIELD OF THE DISCLOSURE

The present disclosure relates to a field of display, and in particular, to an image data processing method, an image capturing device, and a display system.

BACKGROUND

A brightness can be perceived by human eyes is within a wide range of 0.0001 nit in the darkest environment to nearly 100,000 nits in the brightest environment. In extremely bright and dark environments, an eyesight of the human eyes decreases. A brightness range that can be perceived by the human eyes is 0.01 nit to 1000 nits without affecting the eyesight. Taking the brightness range that can be perceived by the human eye without affecting the eyesight as an example, the brightest signal that the human eyes can perceive is 100,000 times of the darkest signal that the human eye can perceive. However, a grayscale range that a general monolithic spatial light modulator can modulate is quite limited. Taking a common 8-bit grayscale signal that the general monolithic spatial light modulator can modulate as an example, maximum grayscales can be displayed is no larger than 256 grayscales, and contrast displayed cannot be larger than 2000:1, either. Regardless of the grayscale or contrast, the range thereof that the general monolithic spatial light modulator can modulate is far smaller than the range thereof that the human eyes can perceive. It is expected that a projection display image can be displayed as close as possible to a natural environment that the human eyes perceive. Therefore, the high-dynamic range (HDR) technology has been proposed to improve a dynamic range of the projection display system.

A general image capturing device, especially a digital image capturing device, usually does not have grayscales corresponding to up to 16 bits. A common method is to capture two images during capturing one frame of image having a short exposure time and containing details of all high parts, and the other image having a long exposure time and containing details of all dark parts. Then, by using an image processing technology, the two low-bit grayscale images respectively containing the details of the bright parts and the details of the dark parts are synthesized into a high-bit grayscale image containing both the details of the bright parts and the details of the dark parts.

SUMMARY

The present disclosure provides an image data processing device including a data acquisition module, configured to acquire image data, wherein the image data including original data information of at least two frames of image, original data information of each frame of image including brightness values of pixels on the frame of an image, a maximum possible brightness that the image data is capable of rendering is Lmax, and a minimum possible brightness that the image data is capable of rendering is Lmin; a data conversion module, configured to receive the image data from the data acquisition module and to convert the original data information of each frame of the image in the image data into new data information, wherein said converting the original data information of each frame of the image in the image data into new data information includes acquiring a maximum brightness value L1 of pixels of the frame of image, taking L1/Lmax as a maximum brightness relative value η of the frame of image, amplifying a brightness value of each of the pixels in the frame of image to 1/η times of an original brightness value of each of the pixel so as to achieve an amplified brightness value, and setting the amplified brightness value to 0, where the amplified brightness value is smaller than Lmin1 and Lmin1>Lmin; and a data output module, configured to output the new data information of each frame of image stored in the data conversion module and the maximum brightness relative value η corresponding to the new data information The present disclosure further provides an image capturing device including the image data processing device and an image capturing module. The image capturing module is configured to capture at least two images with different exposures in each frame and to synthesize the at least two images to obtain the original data information of each frame of image. A brightness range of the image capturing device when capturing images is a range of Lmin to Lmax. The data acquisition module is configured to acquire the image data from the image capturing module.

In an embodiment, the image capturing device further includes a photosensitive system, the photosensitive system is configured to determine, before the capturing module captures each frame of image, a maximum pixel brightness value L1 of an image to be captured, and the image capturing device is configured to set an exposure time and an aperture size when capturing the frame of image based on a maximum pixel brightness value L1'. In this embodiment, by pre-judging the maximum pixel brightness value of the image before capturing images, storage spaces for storing the image are reduced, or the storage spaces are better used for recording details of bright parts and dark parts of the image, thereby reducing a computational burden of the data acquisition module.

In an embodiment, a brightness range that each frame of image captured by the image capturing module is capable of rendering is a range of ηLmin1 to ηLmax. In this embodiment, the brightness range of each captured frame of image can be directly equal to the brightness range of the new data information of each output frame of image after being amplified by 1/η times, so that the image capturing device can better interface with the display system, thereby reducing a data operation thereof.

The present disclosure further provides a display system including the image data processing device described as above. The display system further includes a light source, a light source control device and a light modulation device. The light source control device is configured to control an output light flux of the light source based on the maximum brightness relative value η of each frame of image outputted by the image data processing device in such a manner that the output light flux of the light source is η times a maximum output light flux of the light source, and the light modulation device is configured to modulate light from the light source based on new data information of each frame of image.

DESCRIPTION OF EMBODIMENTS

Figure 1:
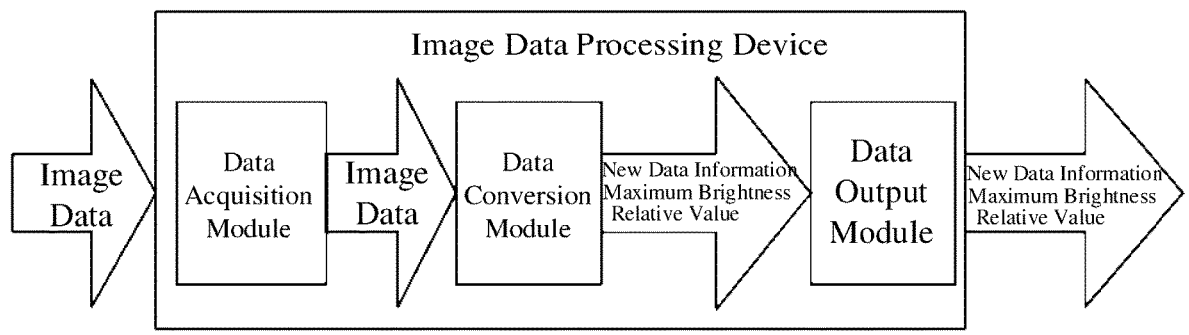
FIG. 1 is a block diagram of an image data processing device according to the present disclosure.

In the present disclosure, a brightness value of a pixel refers to a brightness of white light when displaying this pixel. For example, a brightness value of a blue pixel is obtained by calculating how much white light is required to obtain this blue color and then determining a brightness value of this white light.

Technical Problem

However, for same display image, although the 16-bit grayscale image has a higher dynamic range than the 8-bit grayscale image, an amount of data is also greatly increased, and thus an amount of data of image signals will be greatly increased, which brings difficulties in transmitting and storing image information.

Solution

Aiming at the defects of the large amount of image data information in the prior art, which is not conductive to storage and transmission, the present disclosure provides an image data processing method for making image data suitable for highly efficient storage and transmission.

A basic idea of the present disclosure is to extract an amount representing a relationship between a brightness of one frame of an image and an overall brightness of the image for each frame of the image among image data, while reducing bit length of a brightness data of each pixel in the frame of image.

The image data in the prior art usually includes a large amount of useless information, and each pixel on each frame of image requires multiple bits of data for storing brightness information of this pixel. In the brightness information, there are spaces occupied by multiple bits zero value data between a maximum brightness of the pixel and a maximum brightness of an entire image. For example, if the brightness data of the entire image has data corresponding to 10 bits binary grayscale values, and a grayscale value corresponding to a brightness value of a brightest pixel in one frame of image is only 0001111111, spaces for storing upper three bits of this data is wasted in storing three bits "0". If the frame of image has a resolution of 1080P, which is more than two million pixels, the frame of image requires more than six million bits for storing the upper three bits "0" of pixels, resulting in huge amounts of data.

The present disclosure compares the maximum pixel brightness value of each frame of image with a pixel maximum possible brightness of an image, and the maximum pixel brightness value of the frame of image is amplified to the pixel maximum possible brightness of the image, and at the same time, brightness values of all pixels on the frame of image are amplified by a same ratio. When displaying the image, as long as a brightness of a displaying light source is reduced to a reciprocal of the magnification times of the brightness, the brightness of the displayed image will not be distorted. For example, corresponding to the maximum pixel brightness value of one frame of image, a maximum light output power of a display system corresponds to a grayscale value of 0001111111. The brightness value of pixels is amplified by n times, and the grayscale value of the display system corresponding to the amplified brightness value becomes 1111111000. At the same time, a light output power of the display system becomes 1/n so as to ensure that a brightness of light outputted by the display system does not change. Then according to the actual number of grayscale bits, such as 8 bits, that can be modulated by the display system, the last two bits of the grayscale value corresponding to all pixels on the frame of image are removed such that the above-mentioned "1111111000" becomes "11111110". Then, grayscale data of any one pixel on the frame of image is reduced by 2 bits while adding only one datum for storing the magnification times of n. In general, a data amount of the frame of image is greatly reduced. When displaying the image, as long as a brightness of the displaying light source is reduced to 1/n of the brightness, the brightness of the displayed image is not be distorted.

Since the number of grayscale bits that can be obtained by capturing images in the prior art is always greater than the number of grayscale bits that can be modulated by a display device, the display device always more or less compresses or cuts the data obtained by capturing an image. In the present disclosure, more details of dark parts of the image can be retained and a dynamic contrast can be increased by cutting latter bits of the amplified brightness data. For example, without changing the brightness of the display system, if the display system can actually modulate 8-bit grayscales, "0001111111" will be cut to "00011111". In the technical solution of the present disclosure, a brightness of a light source of the display system is reduced to 1/n of the brightness, "0001111111" becomes "11111110", which makes the image be displayed with details corresponding to two more bits.

The embodiments of the present disclosure will be described in details in the following with reference to the accompanying drawings and implementations.

Referring to FIG. 1, FIG. 1 is a block diagram of an image data processing device according to the present disclosure. The image data processing device includes a data acquisition module, a data conversion module, and a data output module.

The data acquisition module that is a data input end is configured to acquire image data. The image data includes original data information of at least two frames of an image, that is, the image data described in the present disclosure is not of a single image, but of a set of images or a video. It can be understood that a set of images includes two or more frames of the image, and a video includes two or more frames of image. A maximum possible brightness that can be expressed by the image data is Lmax, and a minimum possible brightness that can be expressed by the image data is Lmin. Here, the maximum possible brightness and the minimum possible brightness are respectively an upper brightness limit and a lower brightness limit of entire image data (such as the set of images or the video as a whole), which represent expressiveness of the image data, and it is not necessary that one pixel or several pixels shall display these brightness. For example, the maximum possible brightness of an image data is 100, and the minimum possible brightness of this image data is 1. In this case, a brightness range of pixels on one frame of image of the image data is of only 20 to 80 or an actual maximum pixel brightness in the frame of image of this image data cannot reach 100 are all possible. It should be noted that "the minimum possible brightness" Lmin refers to a minimum brightness that can be expressed except 0 (all pixels are dark), and except a brightness whose grayscale value is equal to 1 when corresponding to the grayscale of a display system.

The original data information of each frame of the image includes information such as the brightness value and chrominance value of each pixel in the frame image, can be general YUV encodes or RGB encodes, etc., which can be converted to each other according to needs.

Compared with the prior art, in the present disclosure, a new brightness value of each pixel is acquired by acquiring the maximum brightness relative value of each frame of image among the image data and then dividing the brightness value of each pixel on the frame of image by the maximum brightness relative value, so that a brightness value of a brightest pixel on the frame of image is equal to an upper brightness limit of the overall brightness of the image, and the brightness values of the remaining pixels are correspondingly increased by the same ratio. New brightness values within the brightness range of Lmin1 to Lmax is selected, and a new brightness value of a pixel whose brightness is smaller than Lmin1 is set to 0. The new brightness value used as the new data information of the image and the maximum brightness relative value are outputted as data for displaying. In this way, there is no waste in blank data resources between the brightness value of the brightest pixel and the upper brightness limit value of the image on each frame of image, which facilitates storing and transferring data with high efficiency.

Compared with the prior art, the display system of the present disclosure amplifies the brightness value among the inputted image data to $1/\eta$ times of the brightness value, and reduces the light flux of the light source to $\eta$ times of the light flux, thereby ensuring that the brightness of the displayed image is not distorted. Meanwhile, with amplification of the brightness of the pixel on each frame of image, the lower bit brightness value representing the details of dark parts can be displayed by the display system, thereby improving the dynamic contrast and image display quality.

In some embodiments, the image data does not include data that directly represents the brightness value of each pixel on the image, but the brightness value of each pixel can be obtained indirectly by means of data encoding conversion and the like. This embodiment is also a technical solution to be protected by the present disclosure, which conforms to the description that "the original data information of each frame of image includes the brightness value of each pixel on the frame of image".

The data conversion module that is a core module of the image data processing device is configured to receive image data from the data acquisition module and convert original data information of each frame of image among the image data into new data information.

Specifically, the data conversion process includes following steps. A maximum pixel brightness value L1 of each frame of image is acquired, and L1/Lmax is taken as a maximum brightness relative value $\eta$ of the frame of image to represent a brightness relationship between frame of image and an entire image. For example, if the maximum pixel brightness value L1 of one frame of image is 50, and the maximum possible brightness (upper brightness limit) Lmax of the entire image is 100, then the maximum brightness relative value of the frame of image is 50%. Subsequently, a brightness value of each pixel on the frame of image is amplified to $1/\eta$ times of its original value. L1 is amplified to $1/\eta$ times, i.e., $L1 \times 1/\eta = Lmax$. As the above example illustrated, the maximum brightness is amplified from 50 to 100, which means it is doubled, so the brightness values of other pixels on the frame of image are also doubled. If the minimum brightness value of the frame of image is set to L2 (except for pixels with a brightness value of 0), then the brightness range of the frame of image changes from a range of L2 to L1 to a range of $L2/\eta$ to $L1/\eta$, i.e., a range of $L2/\eta$ to Lmax.

Since a brightness range that can be obtained by capturing images in the prior art is always larger than a brightness range that can be displayed by a display device, the display device always more or less compresses or cuts image data. Therefore, in the data conversion process of the present disclosure, a cutting step is further included after amplifying the brightness value of each pixel, the cutting step including setting the amplified brightness value which is smaller than Lmin1 as 0. If $L2/\eta \geq Lmin1$, the cut brightness value data remain unchanged; and if $L2/\eta < Lmin1$, the cut brightness value within a range of $L2/\eta$ to Lmin1 (excluding Lmin1) is set as 0. In order to make the cut brightness data be effectively displayed by the display system, Lmin1>Lmin.

Here, Lmin1 can be set according to a brightness value range that can be displayed by the display system, the display system applying the image data. Specifically, in an embodiment, when the maximum brightness that can be displayed by the display system is Lmax (corresponding to a maximum grayscale value of the display system), a minimum non-zero brightness that can be displayed by the display system is Lmin1 (corresponding to a minimum grayscale value of the display system).

In the present disclosure, the amplified brightness value data is cut. In this way, compared with directly cutting data, the present disclosure can retain more details of the dark parts of the image, and improve a dynamic contrast and an image display effect, which is described in details in the Summary of this specification, and thus is not repeated herein.

It can be understood that the data conversion module can also perform data conversion, such as data format conversion or data encoding conversion, on data information, which is well-known in the art. This part is not the focus of the present disclosure and thus is not repeated herein.

So far, new brightness value data of the frame of image obtained after amplifying data and then cutting down data replaces the original brightness value data and becomes part of the new data information of the frame of image.

After the data conversion module converts the original data information of each frame of image among the image data into new data information, the data output module outputs the new data information of each frame of image stored in the data conversion module and the corresponding maximum brightness relative value $\eta$ together as output data of the image data processing device.

In an embodiment of the present disclosure, the brightness range that can be expressed by the original data information of each frame of image is a range of Lmin to Lmax. In this embodiment, the brightness range of each frame of image constituting the image data is consistent with the brightness range that can be expressed by the entire image data, so that data formats of all frames of image are uniform, which facilitates processing data. Same as the above, the brightness range here refers to a range removing a brightness value of 0, that is, a range of the minimum possible brightness to the maximum possible brightness. When corresponding to the grayscale of the display system, it refers to a range of a grayscale value of 1 to the maximum grayscale value.

In another embodiment of the present disclosure, the brightness range that can be expressed by the original data information of each frame of image is a range of ηLmin1 to ηLmax. In this embodiment, when each frame of image is amplified by 1/η times, the brightness range becomes a range of Lmin1 to Lmax, which just makes it not necessary to cut the brightness value. In this way, a step of setting the amplified brightness value smaller than Lmin1 as 0 can be omitted, thereby making data processing easier and faster. Similarly, the brightness range here refers to a range removing the brightness value of 0.

In the present disclosure, the data acquisition module, the data conversion module, and the data output module are divided according to specific functions of the image data processing device. In fact, the three can be an integrated module, and such technical solution also falls into the protection scope of the present disclosure.

The present disclosure further discloses an image capturing device including the above-mentioned image data processing device. In addition, the image capturing device further includes an image capturing module.

The image capturing module is configured to capture at least two images with different exposures in each frame, then to synthesize the at least two images to obtain the original data information of each frame of image. A brightness range captured by the image capturing device is the same as the brightness range of the image data acquired by the data acquisition module, which is a range of Lmin to Lmax. After the capturing of the image capturing module, the data acquisition module is configured to acquire image data from the image capturing module to perform subsequent processes such as data conversion. Similarly, the brightness range described here also refers to a brightness range removing the brightness value of 0.

In an embodiment, a brightness range that can be displayed by each frame of image captured by the image capturing module is a range of Lmin to Lmax. In this embodiment, data formats of all frames of image are uniform, which facilities to process data. In order to satisfy subsequent data amplification and data cut processes, the image capturing module in this embodiment needs to have a powerful capturing capability, so as to ensure that each frame of image after data cutting can be displayed with sufficient details of dark parts. For example, the image capturing device can capture, within one frame, three or more images with different exposures for high-light features, mid-bright features, and low-bright features.

In an embodiment, the image capturing device includes a photosensitive system for dynamically controlling the image capturing module during capturing. Specifically, through program setting, the photosensitive system is configured to determine, shortly before the capturing module captures each frame of image, a maximum pixel brightness value L1 of the image to be captured, and then, the image capturing device is configured to set, according to the maximum pixel brightness value L1, exposure time and an aperture size when capturing the frame of image. The maximum pixel brightness value L1 can be recorded at the same time for later data conversion. The image capturing device in this embodiment reduces a storage space occupied by useless data in each frame of image, specifically, reducing a data storage space occupied by blank brightness from L1 to Lmax. In this way, it is faster and more efficient for the image capturing device to store and transmit data. At the same time, since L1 instead of Lmax is taken as the upper brightness limit when capturing images, it is possible to capture more details of dark parts under a same capturing contrast range, thereby improving a display quality of the images. In some examples, an image synthesized with three exposures in this embodiment is equivalent to an image synthesized with four exposures not employing this embodiment. For example, in a case in which the overall displays with high brightness, an image with a long exposure time may be actually useless.

Further, in an embodiment, the brightness range that can be displayed by each frame of image captured by the image capturing module is a range of ηLmin1 to ηLmax. In this embodiment, when each frame of image is amplified by 1/η times, the brightness range becomes a range of Lmin1 to Lmax, which just makes it not necessary to cut the brightness value. In this way, the complexity of subsequent data processing is simplified from a camera aspect.

Figure 2:
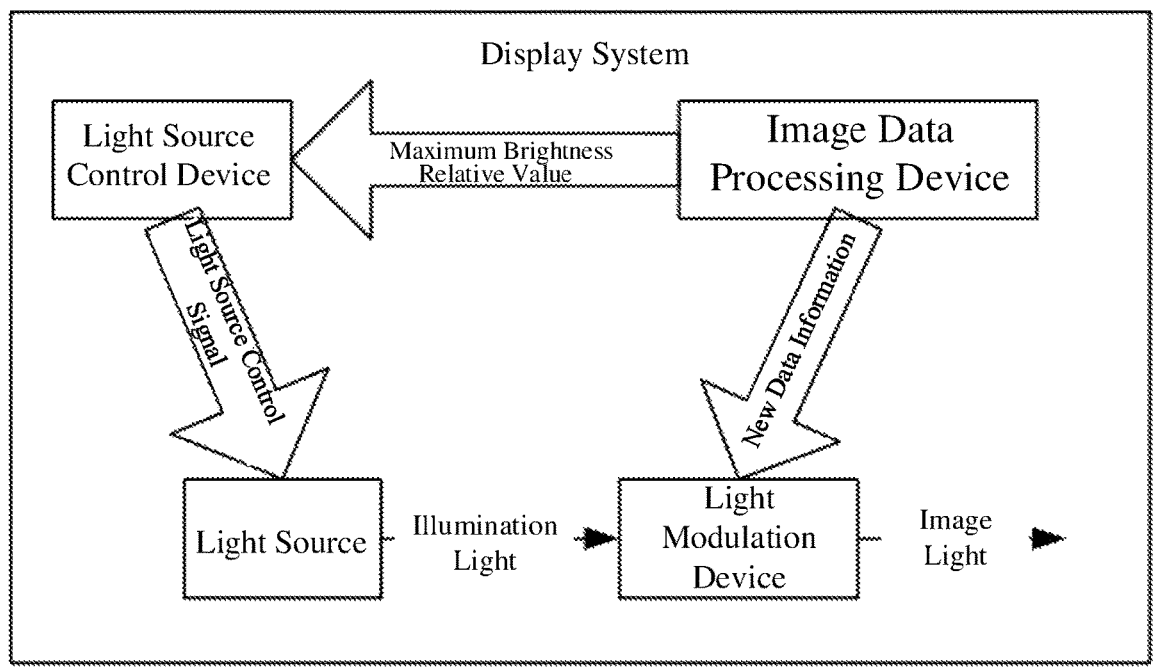
FIG. 2 is a block diagram of a display system according to the present disclosure.
Figure 3:
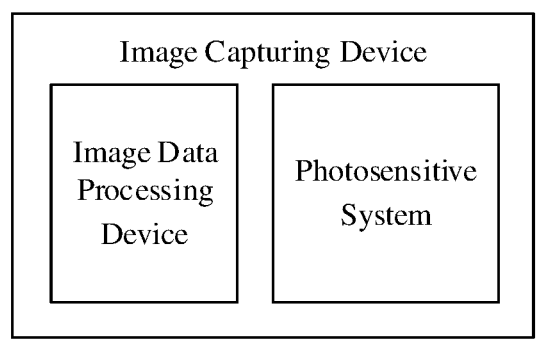
FIG. 3 is a block diagram of an image capturing device according to the present disclosure.
Figure 4:
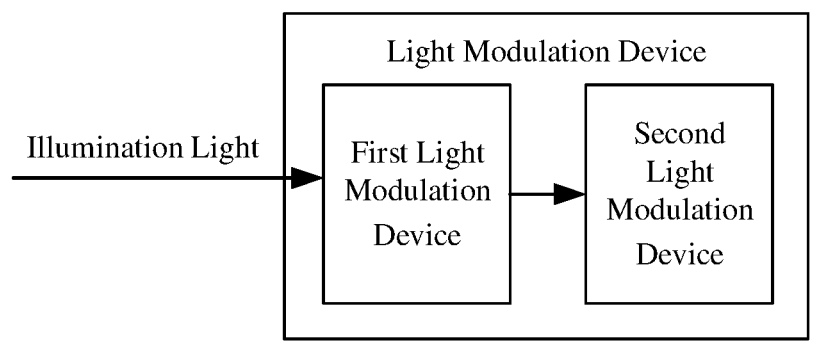
FIG. 4 is a block diagram of a light modulation device according to the present disclosure.

The present disclosure further discloses a display system, as shown in FIG. 2. The display system includes the image data processing device, and the display system further includes a light source, a light source control device, and a light modulation device. The light source emits illumination light that reaches a light-entering surface of the light modulation device, and then the light modulator modulates the illumination light according to image signals and outputs image light. The image light displays a pre-displayed image through a lens or a display screen.

The light source control device is configured to generate a light source control signal according to the maximum brightness relative value η of each frame of image outputted by the image data processing device, and to control output light flux of the light source in such a manner that the output light flux of the light source is η times of a maximum output light flux of the light source. The light modulation device is configured to modulate the light from the light source according to new data information of each frame of image.

In an embodiment, the light source of the display system refers to a whole illumination light module, including light-emitting elements (such as laser diodes, LEDs, laser arrays, etc.) and a light homogenizing and shaping device. The light source outputs a uniform light spot to the light-entering surface of the light modulation device.

The light modulation device can be a light modulation assembly formed by light modulators such as DMD, LCD, or LCOS, and can be a triple modulator system (such as a 3LCD, 3DLP system), a double modulator system, or a single modulator system (such as a single DLP system).

In an embodiment, the light modulation device can further include a first light modulator device and a second light modulation device. The first light modulation device modulates light from the light source, and the second light modulation device modulates output light from the first light modulation device. In this technical solution, two light modulation devices are connected "in series", so that the contrast of the display system is greatly improved, and the grayscales that can be displayed by the display system are greatly increased. For example, the two light modulation devices each generally are 8-bit grayscale, the display system can have 16-bit grayscale, totally having approximately 60,000 grayscale values. If the resolutions of the two light modulation devices are M:1 and N:1, respectively, the contrast of the display system is M×N:1.

In an embodiment, a number of grayscale bits of new data information of each frame of image outputted by the image data processing device is equal to a number of grayscale bits that the light modulation device can modulate, so that the image data processing device can well match the light modulation device.

In an implementation manner, the light modulation device includes a first light modulation device and a second light modulation device, the first light modulation device is configured to modulate the light from the light source, and the second light modulation device is configured to modulate output light from the first light modulation device.

The embodiments in this specification are described in a progressive manner. Each embodiment focuses on a different part from other embodiments, and same or similar parts of these embodiments can be referred to each other.

The above description merely illustrates some embodiments of the present disclosure, and does not intend to limit the patent scope of the present disclosure. Any equivalent structure or equivalent process transformation made by referring to the description and accompanying drawings of the present disclosure or directly or indirectly applied to other related technical field shall fall into the patent protection scope of the present disclosure.

What is claimed is:

1. An image data processing device, configured to:
    acquire image data, wherein the image data comprise original data information of at least two frames of an image, and original data information of each frame of the image comprises brightness values of pixels on the frame of the image; and a maximum possible brightness that the image data is capable of rendering is Lmax and a minimum possible brightness that the image data is capable of rendering is Lmin;
    receive the image data and convert the original data information of each frame of image in the image data into new data information,
        wherein said converting the original data information of each frame of the image in the image data into the new data information comprises:
            acquiring a maximum brightness value L1 of pixels of the image frame;
            taking L1/Lmax as a maximum brightness relative value η of the image frame where L1≥0, and Lmax is a positive number greater than 0;
            amplifying a brightness value of each of the pixels in the image frame to 1/η times of an original brightness value of each of the pixels, so as to achieve an amplified brightness value, where the original brightness value is greater than or equal to 0, and 1>η>0; and
            setting the amplified brightness value to 0 if the amplified brightness value is smaller than Lmin1, wherein Lmax>Lmin1>Lmin; and
    output the new data information of each frame of the image and the maximum brightness relative value η corresponding to the new data information.

2. The image data processing device according to claim 1, wherein a brightness range that the original data information of each frame of image is capable of rendering is a range of Lmin to Lmax.

3. The image data processing device according to claim 1, wherein a brightness range that the original data information of each frame of image is capable of rendering is a range of ηLmin1 to ηLmax.

4. An image capturing device, comprising the image data processing device according to claim 1,
    wherein the image capturing device is configured to capture at least two images with different exposures in each frame and to synthesize the at least two images to obtain the original data information of each frame of image;
    wherein a brightness range of the image capturing device when capturing images is a range of Lmin to Lmax; and
    wherein the image data processing device is configured to acquire the image data from the image capturing device.

5. The image capturing device according to claim 4, wherein a brightness range that each frame of image captured by the image capturing device is capable of rendering is a range of Lmin to Lmax.

6. The image capturing device according to claim 4, further comprising a photosensitive system, wherein the photosensitive system is configured to determine, before the image capturing device captures each frame of the at least two images, a maximum pixel brightness value L1 of an image to be captured, and the image capturing device is configured to set an exposure time and an aperture size when capturing the fame of the at least two images based on a maximum pixel brightness value L1'.

7. The image capturing device according to claim 6, wherein a brightness range that each frame of image captured by the image capturing device is capable of rendering is a range of ηLmin1 to ηLmax.

8. A display system comprising the image data processing device according to claim 1, wherein the display system further comprises:
    a light source;
    a light source control device configured to control an output light flux of the light source based on the maximum brightness relative value η of each frame of image outputted by the image data processing device, in such a manner that the output light flux of the light source is η times of a maximum output light flux of the light source; and
    a light modulation device configured to modulate light from the light source based on the new data information of each frame of the image.

9. The display system according to claim 8, wherein a number of grayscale bits of the new data information of each frame of the image outputted by the image data processing device is equal to a number of grayscale bits that the light modulation device is capable of modulating.

10. The display system according to claim 8, wherein the light modulation device comprises:
    a first light modulation device configured to modulate the light from the light source; and
    a second light modulation device configured to modulate output light from the first light modulation device.

11. The display system according to claim 10, wherein the first light modulation device and the second light modulation device are connected in series;
    and if resolutions of the first light modulation device and the second light modulation device are M:1 and N:1, respectively, a contrast of the display system is M×N:1.

* * * * *